United States Patent [19]

Miller

[11] Patent Number: 5,536,524
[45] Date of Patent: Jul. 16, 1996

[54] METHOD OF MAKING REDUCED CALORIE PEANUT PRODUCTS

[75] Inventor: Mark S. Miller, Arlington Heights, Ill.

[73] Assignee: Kraft Foods, Inc., Northfield, Ill.

[21] Appl. No.: 445,742

[22] Filed: May 22, 1995

Related U.S. Application Data

[63] Continuation of Ser. No. 239,300, May 6, 1994, abandoned.
[51] Int. Cl.⁶ .................................................. A23L 1/38
[52] U.S. Cl. ..................... 426/633; 426/518; 426/519; 426/520; 426/611; 426/632; 426/804
[58] Field of Search ................................. 426/632, 633, 426/518, 519, 520, 804, 611

[56] References Cited

U.S. PATENT DOCUMENTS 4,863,753  9/1989  Hunter et al. .......................... 426/633
5,164,217  11/1992  Wong et al. .......................... 426/632

*Primary Examiner*—Helen Pratt
*Attorney, Agent, or Firm*—Fitch, Even, Tabin & Flannery

[57] ABSTRACT

A method for providing a reduced fat, reduced caloric peanut butter composition. The method consists of the steps of providing a mixture of peanut meal having from about 5% to about 35% peanut oil and a polyol fatty acid polyester having at least four esterified hydroxyl groups. The polyol polyester is present in the mixture at a level of from about 10% to about 25% by weight, based on the weight of the peanut meal. The mixture is ground to provide a peanut paste and the peanut paste is mixed with additional polyol fatty acid polyesters having at least four esterified hydroxyl groups to provide a peanut butter product having a total fat content of from about 45% to about 55% by weight, but having a reduced level of digestible fat.

18 Claims, No Drawings

METHOD OF MAKING REDUCED CALORIE PEANUT PRODUCTS

This is a continuation, of application Ser. No. 08/239,300, now abandoned, filed May 6, 1994.

FIELD OF THE INVENTION

The present invention is directed to a reduced calorie and reduced fat peanut butter spread and a method for manufacture thereof. More particularly, the present invention is directed to producing a peanut butter spread having reduced, metabolizable fat, high protein and a low level of moisture which is shelf stable at ambient temperatures.

BACKGROUND OF THE INVENTION

Conventional peanut butter is prepared from shelled peanuts roasted at about 170° C., which are thereafter cooled to about 30° C. These roasted peanuts are then blanched, the skins and nibs are removed and the blanched kernels are split into halves. The blanched, split peanuts are then coarsely ground and to the coarsely ground nuts are added optional ingredients, such as sweetener, salt and hydrogenated vegetable oil. All of the ingredients are thoroughly mixed and are then finely ground. This mixture is then cooled and packed into jars.

Peanut butter is a highly nutritious food containing high levels of protein. However, peanut butter also contains relatively large quantities of fat. A typical peanut butter product will have an oil content of about 50%, a protein content of about 29% and a fiber content of 1% to 2%. Sugars, carbohydrates and moisture normally constitute the rest of the product. The moisture level is usually less than about 2%. Due to the low moisture level and the high level of oil, peanut butter is a highly stable product which can be kept unrefrigerated for substantial periods of time.

To be labeled "peanut butter" under the applicable regulations of the United States Food and Drug Administration, the peanut ingredients must comprise at least 90% of the weight of the finished product, 21 C.F.R. §164,150. If more than 10% of the peanut product consists of non-peanut ingredients, then the product may be termed a "peanut spread", 21 C.F.R. §102.23(a) so long as it meets all of the conditions set forth in 21 C.F.R. §102.23(b). One of these conditions is that the protein content of the product is at least 24% by weight of the finished product.

There has been a substantial amount of research directed to reducing the oil content and, thus, the calorie content of peanut butter. One of the most common methods for effectively decreasing the amount of calories per unit volume in food products is the addition of water as a non-calorie ingredient together with a thickener or emulsifier to duplicate the texture of the original product. However, the addition of water adversely affects the flavor, color, texture and mouthfeel of peanut butter products. More importantly, unlike peanut butter which is microbiologically stable at room temperature of the high level of oil and the low level of water, generally about 1–2% by weight, peanut butter products having high levels of water must usually be refrigerated after opening even if the peanut butter products contain preservatives to retard spoilage.

Replacement of oil with bulking agents has been proposed. U.S. Pat. No. 4,814,195 to Yokoama, et al. is directed to a reduced calorie peanut butter product containing from about 15% to about 40% by weight of a solid bulking agent selected from polydextrose and microcrystalline cellulose.

U.S. Pat. No. 4,828,868 to Lasden, et al. is directed to a low calorie, low fat peanut butter-like product and a method for making the product. In the method, unroasted defatted or partially defatted peanut flour having no more than about 35% fat by weight is milled in the presence of water to a maximum particle size of about 150 microns. The mixture of water and peanut flour is then cooked at a temperature of between about 175° F. and the boiling point of the mixture of peanut flour and water. The moisture level of the finished product is high and it is indicated in the Lasden, et al. patent that the product requires refrigeration for extended shelf life. While the Lasden, et al. patent indicates that defatted peanut flours that have as little as 1% fat can be used, no specific examples are provided as to how to produce a peanut butter product having as low as 1% fat.

U.S. Pat. No. 5,258,192 to Zook, et al. is directed to the production of low calorie nut products and a process for making them. It is taught that low calorie triglycerides may be substituted for nut oils in the manufacture of nut products. The low calorie triglycerides are described in detail. On the simplest level, they are esters of glycerol in which the normal random distribution of fatty acids has been replaced by a precisely defined distribution of long ($C_{16}$–$C_{40}$) and short $C_2$–$C_5$) chain fatty acids. In every other regard, these low calorie triglycerides are identical to those found in nature, and indeed to those found in the nut oils which they are replacing.

A major distinction between the Zook, et al. patent and the present invention is the fact that the polyol fatty acid polyesters described herein are not triglycerides. They are low calorie (in the case of polyglycerol polyesters) and noncaloric (in the case of the sugar or sugar alcohol polyesters) substitutes for triglyceride fat. Although functionally similar, they are structurally dissimilar to triglyceride fats and oils.

Preparation of partially defatted nuts and subsequent reexpansion of the nuts by steaming or cooking is well known in the art (U.S. Pat. No. 2,003,415 to Ammann and U.S. Pat. No. 3,294,549 to Vix, et al.). Contacting partially defatted nuts with glycerol before roasting is also known (U.S. Pat. No. 4,049,833 to Gannis, et al.). Pressing preroasted nuts has also been described (U.S. Pat. No. 4,329,375 to Holloway, et al.).

The teachings that are found in the Zook, et al. patent include a variety of methods for preparing nuts and nut products from partially defatted nuts which are contacted either before or after roasting with the low calorie triglyceride substance. The triglyceride material is infused into the partially defatted nuts or combined with a flour made from roasted, partially defatted nuts. Infusion of the nuts with triglyceride can be carried out by soaking them in a bath, coating or spraying them, using various temperature and pressure protocols. The nuts, either before or after reconstitution, are roasted by conventional procedures which are described fully in the patent. In none of these teachings is anything other than triglyceride fat mentioned as being an appropriate medium for reconstituting or roasting the nuts.

Furthermore, the Zook, et al. patent teaches that nut butter products, instead of using whole, split or pieces of nuts, is made with a defatted nut flour. In accordance with the present invention, the best nut butter product is made from granular pieces, and the product made from the defatted nut flour, while lower in calories, is inferior in taste and texture.

It would be highly desirable to provide a flexible method for preparation of lowered fat peanut butter products having from about 70% to less than 1% of the metabolizable fat normally associated with peanut butter, i.e., a total peanut oil content of from about 1% to about 35%.

Accordingly, it is a principal object of the present invention to provide a method for the manufacture of lowered fat, lowered calorie peanut butter products.

The present invention provides a peanut butter analog which provides a desirable reduction in metabolizable fat and adds an additional benefit of a reduction in calories. The creamy properties of peanut butter, which are inherently provided by the peanut oil, are supplied by fatty materials which are non-digestible as compared to peanut oil. The peanut butter analogs are equivalent to conventional peanut butter and have flavor, body and texture resembling that of conventional peanut butter.

SUMMARY OF THE INVENTION

The present invention is directed to a method for providing a reduced fat, reduced calorie peanut butter composition. In one embodiment, the method consists of the steps of providing a mixture of peanut meal having from about 5% to about 35% peanut oil and a polyol fatty acid polyester having at least four esterified hydroxyl groups. The polyol polyester is present in the mixture at a level of from about 10% to about 55% by weight, based on the weight of the peanut meal. The mixture is ground to provide a peanut paste and the peanut paste is mixed with additional polyol fatty acid polyesters having at least four esterified hydroxyl groups to provide a peanut butter product having a total fat content of from about 45% to about 55% by weight, but having a reduced level of digestible fat.

In another embodiment of the invention, raw, unroasted peanuts are ground to provide peanut granules. The peanut granules are subjected to several extractions with hexane to remove substantially all of the peanut oil from the granules. After removing substantially all of the hexane solvent from the peanut granules, the peanut granules are combined with a polyol fatty acid polyester having at least four esterified hydroxyl groups. The mixture of peanut granules and polyol polyester are mildly heated to assure complete absorption of the polyol polyester. The peanut granules with absorbed polyol polyester are then subjected to sufficient heat for a time sufficient to develop roasted flavors. The roasted, reconstituted peanut granules are crushed and mixed with the remaining peanut butter ingredients, such as salt, sugar and emulsifiers. Additional polyol polyester may also be mixed with the peanut granules at this point in the process. The peanut mixture is then subjected to milling and grinding to produce a full flavored peanut butter product with no digestible fat calories.

In a further embodiment of the invention, raw, whole, unroasted peanuts are subjected to pressing in a hydraulic press to remove a portion of the peanut oil to provide a crushed, whole peanut having from about 15% to about 35% peanut oil. The peanuts are then expanded by subjecting the pressed peanuts to heat such as steam. The expanded peanuts are then immersed in a liquid polyol fatty acid polyester for a period of time sufficient to equilibrate the uptake of the polyol fatty acid polyester in the peanuts.

The use of polyol fatty acid polyesters to replace triglyceride fats in various food products is well known. Polyol fatty acid polyesters have the ability to provide fat-like properties to various foods, but have the advantage in that they are not digestible in the human digestive system and pass through without contributing any calories. The problem associated with replacing triglyceride oil in peanuts is that the flavor of peanuts is developed during the roasting process and is carried in a subsequent peanut butter product substantially in the peanut oil. If the peanut oil is removed after roasting, the flavor associated with peanuts is lost. The present invention is directed to methods for the incorporation of polyol fatty acid polyesters into a peanut butter product while still retaining a substantial level of the peanut flavor associated with peanut butter. The polyol of the polyester is preferably selected from the group consisting of sugars and sugar alcohols containing from 4 to 8 hydroxyl groups and polyglycerols containing from 5 to 15 glycerol moieties. Preferably, at least four of the hydroxyl groups of the sugars and sugar alcohols, and at least 85% of the hydroxyl groups of the polyglycerols are esterified with fatty acids. When the polyol is a sugar, sugar alcohol or polyglycerol, the fatty acid ester groups preferably have saturated or unsaturated alkyl groups consisting essentially of from about 4 to about 24, preferably from about 8 to about 24, and most preferably from about 14 to about 22 carbon atoms.

The more preferred polyol fatty acid polyester low-calorie fatty materials for use in the present invention are those sugar, sugar alcohol and polyglycerol fatty acid polyesters which (a) are solid or semi-solid at room temperature; (b) are liquid at body temperature and to which is added sufficient anti-anal leakage agent to prevent leakage of the liquid polyester through the anal sphincter. The most preferred polyol fatty acid polyesters are those wherein the polyol is sucrose.

DETAILED DESCRIPTION OF THE INVENTION

The present invention provides low-calorie peanut butter and peanut products which exhibit as much as a 70% reduction in calories. There is no animal fat or cholesterol in peanut butter. The peanut butter products contain about the same level of protein as conventional peanut butter products, but have from about 1% to about 70% of the usual amount of vegetable fat present in traditional full fat peanut butter.

Methods for extracting peanut oil from peanuts are well known. U.S. Pat. No. 3,947,599 to Mitchell, for instance, describes a method for making fully defatted or partially defatted flavorless shelf stable peanut flakes or flour by forming an aqueous mix of finely ground raw peanuts, drying the mix into a thin stratum and extracting the oil with a solvent, such as hexane. Peanuts may also be partially or fully defatted by extraction with supercritical carbon dioxide. It is also known to partially extract peanut oil from peanuts by use of hydraulic pressure, such as in a Carver hydraulic press or in a cocoa press. Such partially defatted peanut extracts generally contain from about 12% to about 30% peanut oil. As used herein, the term "peanut flour" means a fully defatted peanut material having less than 1% peanut oil. The term "peanut paste" means a partially defatted or non-defatted, ground, spreadable peanut material having from about 1% to about 50% of peanut oil.

The method of the present invention may be used to make a fully defatted peanut butter spread utilizing peanut flour containing less than about 1% peanut oil. The method may also be used to make a partially defatted peanut butter spread having from about 1% to about 35% peanut oil through use of peanut paste or a combination of peanut paste and peanut flour. All percentages used herein are by weight and are based on the weight of the peanut spread composition, unless otherwise indicated.

In one embodiment of the method of the present invention, roasted peanuts are ground and subjected to pressing to remove from about 30% to about 90% of the peanut oil present in the ground peanuts and to provide a defatted peanut meal having from about 35% peanut oil for consistency. The peanut meal is mixed with a polyol fatty acid polyester. The polyol polyester is present in the mixture at a level of from about 10% to about 25% by weight, based on the weight of the peanut meal. At levels of greater than about 25% polyol polyester at this point in the process, the mixture becomes too fluid to grind in subsequent steps of the method. The mixture of peanut meal and polyol polyester is then ground to provide a peanut paste, which is substantially stiffer at room temperature than is desirable for commercial distribution. The mixture is heated to a temperature in the range of from about 100° F. to about 140° F. and is then mixed with additional polyol fatty acid polyesters to provide a peanut butter product having a total fat content, i.e., triglyceride fat plus polyol fatty acid polyester, of from about 45% to about 55% by weight. The peanut butter product has a desirable creamy texture and roasted flavor at room temperature.

The polyol fatty acid polyester which is added to the peanut meal prior to grinding is preferably heated to a temperature above its melting point prior to combining the polyol polyester with the peanut meal. In general, the polyol fatty acid polyester is heated to a temperature in the range of from about 100° F. to about 140° F. prior to combining with the peanut meal.

Sugar, salt and emulsifiers are preferably used in the peanut butter composition of the present invention. The sugar, salt and emulsifiers may be added before or after the grinding step to provide a peanut paste. The sugar is generally present in the mixture at a level of from about 2% to about 12% by weight, based on the weight of the peanut meal. The salt is preferably present in the mixture at a level of from about 1% to about 4% by weight, based on the weight of the peanut meal. Emulsifiers, such as mono- and di- glycerides and lecithin are preferably used at a level of from about 0.5% to about 3% by weight, based on the weight of the peanut meal.

Many classes of low-calorie polyol fatty acid polyester materials are suitable for use in the present invention. Examples of such materials are: fatty alcohol esters of polycarboxylic acids (U.S. Pat. No. 4,508,746 to Hamm); fatty polyesters of polyglycerol (U.S. Pat. No. 3,932,532 to Hunter, et al.); (use in cheese products disclosed in German Patent 207,070); ethers and ether esters of polyols containing the neopentyl moiety (U.S. Pat. No. 2,962,419 to Minich); fatty alcohol diesters of dicarboxylic acids such as malonic and succinic acid (U.S. Pat. No. 4,582,927 to Fulcher); triglyceride esters of alpha branched chain-alkyl carboxylic acids (U.S. Pat. No. 3,579,548 to Whyte); and sugar and sugar alcohol fatty acid polyesters (U.S. Pat. Nos. 3,600,186 to Mattson, et al.; 4,005,195 to Jandacek, et al.; 4,005,196 to Jandacek, et al.; 4,034,083 to Mattson; and 4,241,054 to Volpenheim, et al.). The fatty moieties of these materials typically contain from 8 to 24 carbon atoms, preferably from about 14 to about 18 carbon atoms.

For reasons of cost efficiency, consumer acceptability and assurance of inherent safety, the preferred polyol fatty acid polyesters for use in the peanut butter products of the present invention are sugar, sugar alcohol, and polyglycerol fatty acid polyesters and mixtures thereof. The polyol fatty acid polyester compounds are prepared by reacting a monosaccharide, disaccharide, sugar alcohol or polyglycerol with fatty acids.

Sugar and sugar alcohol fatty acid polyesters are among the preferred polyol fatty acid polyesters for use as the low-calorie fatty materials in the present invention and comprise fatty acids and sugars or sugar alcohols as polyols. The term "sugar" is used herein in its conventional sense as generic to mono- and disaccharides. The term "sugar alcohol" is likewise used in its conventional sense as generic to the reduction product of sugars wherein the aldehyde or ketone group has been reduced to an alcohol. The sugars and sugar alcohols preferred for use herein contain from about 4 to about 8 hydroxyl groups.

Examples of suitable monosaccharides are those containing 4 hydroxyl groups such as xylose, arabinose and ribose; the sugar alcohol derived from xylose, i.e., xylitol, is also suitable. The monosaccharide erythrose is not suitable for the practice of this invention since it only contains 3 hydroxyl groups, however, the sugar alcohol derived from erythrose, i.e., erythritol, contains 4 hydroxyl groups and is thus suitable. Among 5 hydroxyl -containing monosaccharides that are suitable for use herein are glucose, mannose, galactose, fructose and sorbose. A sugar alcohol derived from fructose, glucose or sorbose, e.g., sorbitol, contains 6 hydroxyl groups and is also suitable as the alcohol moiety of the fatty acid ester compounds. Examples of suitable disaccharides are maltose, lactose and sucrose, all of which contain 8 hydroxyl groups.

The sugar or sugar alcohol fatty acid polyesters useful in this invention must contain at least 4 fatty acid ester groups. Sugar or sugar alcohol fatty acid polyester compounds that contain 3 or less fatty acid ester groups are digested in, and the products of digestion are absorbed from, the intestinal tract much in the manner as ordinary triglyceride fats, whereas the sugar or sugar alcohol fatty acid polyester compounds that contain 4 or more fatty acid ester groups are substantially non-digestible and consequently non-absorbable by the human body. It is not necessary that all of the hydroxyl groups of the sugar or sugar alcohols be esterified with fatty acid, but it is preferable that the polyol contain no more than 3 unesterified hydroxyl groups, and more preferable that it contain no more than 2 unesterified hydroxyl groups. Most preferably, substantially all of the hydroxyl groups of the sugar or sugar alcohol are esterified with fatty acid, i.e., the compound is substantially completely esterified. The fatty acids esterified to the sugar or sugar alcohol molecule can be the same or mixed.

Preferred sugars or sugar alcohols for preparing the polyesters for use in the present invention are selected from the group consisting of erythritol, xylitol, sorbitol, glucose and sucrose. Sucrose is especially preferred.

Polyglycerol fatty acid polyesters are also among the preferred low-calorie fatty materials for use in the present invention and comprise fatty acids and polyglycerol as a polyol. The term "polyglycerol" is used herein to describe mixtures of ethers of glycerol with itself, ranging from 2 to 30 glycerol units per molecule. Polyglycerol is prepared by polymerization of glycerol in the presence of either acid or base with the removal of water during reaction. For example, the synthesis described in U.S. Pat. No. 3,968,169 of Seiden, et al., is suitable and is incorporated by reference herein. Polyglycerol can be fractionated by methods known in the art, such as molecular distillation, to give specific polymer ranges. The polyglycerol ester compounds are prepared by reacting a polyglycerol with such fatty acids as will be disclosed herein. Preferred polyglycerols contain predominantly about 5 to about 15, and more preferably about 6 to about 10, etherified glycerol units.

A characterizing feature of the polyglycerol fatty acid polyesters useful in this invention is that they predominantly contain at least 4, and preferably at least 5, etherified glycerol units, and have at least 75%, preferably at least 85%, of their hydroxyl groups esterified with fatty acids. Polyglycerol fatty acid polyester compounds that contain 3 or less etherified glycerol units are digested, absorbed and metabolized much in the same manner as ordinary triglyceride fats, but polyglycerol fatty acid polyester compounds that contain 4 or more etherified glycerol units are digested, absorbed and metabolized to a lesser extent, or not at all, and thus have the desired low-calorie properties for use in this invention.

The polyol starting material, e.g., the sugar, sugar alcohol or polyglycerol, must have at least 4 hydroxyl groups and must be esterified on at least four of the hydroxyl groups with a fatty acid containing from about 2 to about 24, preferably from about 8 to about 24, and most preferably from about 14 to about 18 carbon atoms. Examples of such fatty acids include caprylic, capric, lauric, myristic, myristoleic, palmitic, palmitoleic, stearic, oleic, ricinoleic, linoleic, linolenic, eleostearic, arachidic, arachidonic, behenic and erucic acid. The fatty acids can be derived from naturally occurring or synthetic fatty acids; they can be saturated or unsaturated, including positional or geometrical isomers.

Sucrose fatty acid polyesters are highly preferred polyol polyesters for use as the low-calorie fatty materials in the present invention. The sucrose fatty acid polyesters preferably have the majority of their hydroxy groups esterified with fatty acids. Production of sucrose fatty acid polyesters usually results in mixtures of sucrose esters having different degrees of esterification. Preferably at least about 85% and most preferably at least about 95%, of the sucrose fatty acid esters in said mixtures are selected from the group consisting of octaesters, heptaesters and hexaesters and mixtures thereof. Preferably, no more than 35% of the esters are hexaesters or heptaesters, and at least about 60%, preferably at least about 70%, of the esters are octaesters. It is also most preferred that the polyesters have a total content of penta- and lower esters of not more than 3%.

The sucrose fatty acid esters are preferably esterified with particular kinds of fatty acids. Preferably, at least about 80%, and most preferably at least about 90%, of the fatty acids are selected from the group consisting of $C_{16:0}$ (palmitic), $C_{18:0}$ (stearic), $C_{18:1}$ (oleic), $C_{18:2}$ (linoleic), $C_{22:0}$ (behenic) and $C_{22:1}$ (erucic) fatty acids, their geometrical and positional isomers.

The polyol fatty acid polyesters used in the composition of the present invention can be liquid, solid, semisolid or mixtures thereof. It is preferable, however, to use a fatty substance in the liquid or semi-solid form, rather than the solid form, because higher levels can be incorporated without adversely affecting the consistency or taste of the peanut butter products. This is because the peanut oil of peanut butter which is being replaced with the polyol fatty acid polyester is a liquid or semi-solid at room temperature.

Solid polyol fatty acid polyesters as defined herein are those which are solids at body temperature, i.e., have a melting point of above about 37° C. (98.6° F.). Non-limiting examples of specific solid polyol fatty acid esters include sucrose octastearate, sucrose octapalmitate, sucrose heptastearate, xylitol pentastearate, galactose pentapalmitate and the like and saturated polyol polyesters having at least four hydroxyl groups esterified with $C_{10}$–$C_{22}$ saturated fatty acids.

The liquid polyol fatty acid polyesters are defined herein as those which are liquids at body temperature, i.e., have a melting point of about 37° C. (98.6° F.) or below. In general, liquid esters are those which are made from predominantly unsaturated fatty acids, whereas solid esters are made from predominantly saturated fatty acids. In order to provide liquid polyol fatty acid polyesters, generally at least about half of the fatty acids incorporated into an ester molecule must be unsaturated. Oleic and linoleic acids and mixtures thereof, are especially preferred. The following are non-limiting examples of specific liquid polyol fatty acid polyesters containing at least four fatty acid ester groups suitable for use in the present invention: glucose tetraoleate, the glucose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of soybean oil fatty acids, xylitol pentaoleate, sucrose tetraoleate, sucrose pentaoleate, sucrose hexaoleate, sucrose heptaoleate, sucrose octaoleate and mixtures thereof.

In another embodiment of the present invention, raw, unroasted peanuts are ground sufficiently to produce peanut granules having a particle size of from about 2 mm to about 6 mm. The peanut granules may optionally be subjected to hydraulic pressing to partially defat the granules to a level of about 30% fat. The peanut granules are then subjected to multiple hexane extraction passes and washes followed by a mild desolventization process to remove any residual hexane. The hexane extraction removes substantially all of the peanut oil from the peanut granules. It should be noted that hexane extraction processes, such as that described in U.S. Pat. No. 3,947,599 to Mitchell utilize a peanut flour having a very fine particle size for solvent extraction. The use of a fine particle size peanut flour, of course, results in extraction efficiencies. The use of peanut granules in accordance with the present invention provides a means for establishing peanut flavor in subsequent steps of the process.

The defatted peanut granules are then combined with liquid polyol fatty acid polyester which is heated to a temperature sufficient to assure that the polyol fatty acid polyester is liquid, generally to a temperature of from about 120° F. to about 180° F. Preferably, only about 40% to about 60% of the total polyol fatty acid polyester which is to be added to the defatted peanut granules is added at this point in the process. The mixture of peanut granules and polyol fatty acid polyester is mixed for a period sufficient to permit absorption of the polyol fatty acid polyester into the peanut granules. Mild heat of from about 90° F. to about 120° F. may be used during this step to assist in absorption of the polyol fatty acid polyester. The peanut granules with absorbed polyol fatty acid polyester are then subjected to a roasting process to develop a typical roasted peanut flavor. The roasting process is effected by conveying the peanut granules through successive temperature zones to increase the temperature of the peanut granules to a temperature in the range of from about 160° F. to about 180° F. for a period of about 5 to about 60 minutes. The roasting step is effected with dry heat to develop the desired flavor.

The roasted peanut granules are then crushed and ground to provide a peanut paste. Sugar, salt and emulsifier are mixed with the peanut paste to provide a triglyceride free peanut butter product wherein the only fatty material present is the polyol fatty acid polyester.

In a further embodiment of the present invention, a method is provided for manufacture of a whole defatted peanut incorporating a polyol fatty acid polyester to provide a peanut flavor substantially equivalent to that associated with roasted peanuts. In accordance with this embodiment of the invention, whole, blanched, unroasted peanuts are pressed to remove peanut oil from the peanuts. The pressing process substantially deforms the whole peanuts and removes from about 15% to about 60% of the peanut oil from the peanuts. The deformed whole peanuts are expanded back to their original shape by subjecting the pressed peanuts to heat. The heat is preferably provided by subjecting the pressed peanuts to a steam atmosphere. The use of a steam atmosphere requires a drying step to remove water absorbed by the expanded peanuts. If dry heat is used to expand the pressed peanuts, an additional drying step is not required.

The expanded, dried peanuts are then immersed in a bath of liquid polyol fatty acid polyester. The polyol fatty acid polyester is preferably heated to a temperature of from about 120° F. to about 160° F. to assure that the polyol fatty acid polyester is liquified and to accelerate the absorption process. The peanuts are permitted to remain in the polyol fatty acid polyester bath for a period of time sufficient to equilibrate the uptake of the polyol fatty acid polyester into the peanuts. Preferred polyol fatty acid polyesters have a melting point in the range of from about 80° F. to about 160° F.

After the peanuts have absorbed an equilibrium level of polyol fatty acid polyester, the peanuts are subjected to a roasting step to develop flavor therein. As previously described, the roasting step takes place by placing the peanuts on a conveyor belt and transporting the peanuts through roasting ovens where the temperature is progressively increased to a temperature level of from about 160° F. to about 180° F. for a period of from about 5 minutes to about 60 minutes. The process of the present invention provides whole, roasted peanuts having from about 15% to about 35% of triglyceride fat and from about 40% to about 10% of polyol fatty acid polyester.

The whole roasted peanuts produced by the method of the present invention may be consumed as whole peanuts, they may be ground into relatively large particles for incorporation into dessert products, such as ice cream or they may be ground into a paste to provide peanut butter.

EXAMPLE 1

In this example, partially defatted peanuts were reconstituted with polyol fatty acid polyester and then subjected to a roasting procedure to provide reduced calorie whole peanut granules. The partially defatted peanuts had been previously prepared by subjecting whole, unroasted peanuts to a hydraulic press. The pressed peanut preparation had reexpanded following release from the press, and were in the form of 3–6 mm granules. The triglyceride content of the partially defatted granules was approximately 15%.

The polyol fatty acid polyester of this example had been previously prepared from sucrose and fatty acid methyl esters from partially hydrogenated oil. The melting point of this sucrose polyester preparation was approximately 90° F.

Below is the composition of the reconstituted peanut granules product.

| Ingredient | Percent | Weight (g) | Calories per 100 g |
|---|---|---|---|
| Partially defatted peanut granules | 60 | 315 | 285 |
| Sucrose Polyester | 40 | 210 | 0 |
| Total | 100 | 525 | 285 |

The raw partially defatted peanut granules were mixed with sucrose polyester which had been melted at about 150° F. The mixture was spread over a stainless steel roasting pan, forming a layer about 1 cm thick. Reconstitution of the peanut granules was accomplished by holding the mixture at 150° F. for 5 minutes. The reconstituted granules were roasted by slowly increasing the temperature of the oven to 320° F. over 20 minutes, and holding the mixture at this temperature for an additional 40 minutes. The roasted granules were then removed from the oven and cooled to ambient temperature.

The final product has rich, roasted peanut aroma and taste. The peanut granules have less than half the calories of conventional roasted peanuts.

EXAMPLE 2

The partially defatted peanuts which had been reconstituted with polyol fatty acid and roasted as described in Example 1 were finely ground and dispersed to make a smooth, creamy reduced triglyceride peanut butter. Presented below is the final composition of the peanut butter product.

| Ingredient | Percent | Weight (g) | Calories per 100 g |
|---|---|---|---|
| Partially defatted peanut granules | 52 | 312 | 247 |
| Sucrose Polyester | 35 | 210 | 0 |
| Sugar | 10 | 60 | 40 |
| Salt | 2 | 12 | 0 |
| Lecithin | 1 | 6 | 9 |
| Total | 100 | 525 | 285 |

Salt, sugar and lecithin were mixed with the roasted granules. This mixture was transferred to a commercial food processor and ground to a coarse peanut paste. Final grinding was achieved by twice refining the peanut paste with a small 3-roll mill with 2×6 inch rollers. The final product had rich roasted peanut aroma and flavor, and a smooth, easily spreadable consistency. It has 85% less triglyceride fat than a conventional peanut butter and fewer than half the calories.

EXAMPLE 3

A fat free peanut butter was prepared from fully defatted peanut flour. The peanut flour had been prepared from unroasted peanuts which had been subjected to pressure in a hydraulic press, and then extracted 6 times with hexane. The defatted peanut flour contains less than 1% triglyceride. The polyol fatty acid polyester of this example is the same as that described in Example 1. The final composition of the fat free peanut butter product is presented below.

| Ingredient | Percent | Weight (g) | Calories per 100 g |
|---|---|---|---|
| Partially defatted peanut flour | 40 | 65.28 | 100 |
| Sucrose Polyester | 47 | 76.70 | 0 |
| Sugar | 10 | 16.32 | 40 |
| Salt | 2 | 3.264 | 0 |
| Lecithin | 1 | 1.632 | 9 |
| Total | 100 | 163.196 | 209 |

The fully defatted peanut flour was mixed with an equal weight of sucrose polyester. The resulting mixture was of a dry, doughy consistency, but which readily crumbled into granular clumps. The mixture was roasted to 320° F. for 40 minutes. The remaining sucrose polyester was added to the mixture, blended until smooth, and placed back into the 320° F. roaster for an additional 20 minutes to allow development of color and roasted flavor.

Sugar, salt and lecithin were added to the roasted peanut flour. Final grinding of the mixture was carried out on the small 3-roll refiner. The final product was a firm peanut paste, which could be blended with the peanut butter of Example 1 to achieve even further calorie reduction, or with additional sucrose polyester. The peanut product has one third the calories of a conventional full-fat peanut butter.

What is claimed is:

1. A method for manufacture of a reduced calorie, full flavored peanut butter comprising:
   (a) providing a mixture of peanut flour having less than about 1% peanut oil and a polyol fatty acid polyester, the polyol fatty acid polyester being present in the mixture at a level of from about 15% to about 50% by weight based on the weight of the peanut flour;
   (b) heating the mixture to a temperature sufficient to roast the peanut flour and develop peanut flavor;
   (c) combining the mixture from step (b) with additional polyol fatty acid polyesters; and
   (d) grinding the combined mixture from step (c) to provide a reduced calorie, full flavored peanut butter with substantially no digestible fat.

2. A method in accordance with claim 1 wherein the peanut flour is derived from roasted peanuts.

3. A method in accordance with claim 1 wherein the polyol fatty acid polyester is a sugar or sugar alcohol fatty acid polyester.

4. A method in accordance with claim 3 wherein the fatty acid groups of the polyol fatty acid polyester are selected from the group consisting of saturated and unsaturated fatty acids having from about 2 to about 24 carbon atoms, their geometric and positional isomers, and mixtures thereof.

5. A method in accordance with claim 4 wherein each fatty acid group has from about 8 to about 24 carbon atoms.

6. A method in accordance with claim 5 wherein each fatty acid group has from about 14 to about 18 carbon atoms.

7. A method in accordance with claim 3 wherein the polyol fatty acid polyester is a sugar or sugar alcohol fatty acid polyester derived from a sugar or sugar alcohol containing from 4 to 8 hydroxyl groups and wherein the sugar or sugar alcohol fatty acid polyester has at least 4 fatty acid groups.

8. A method in accordance with claim 7 wherein the the polyol fatty acid polyester is a sugar alcohol fatty acid polyester containing a sugar alcohol selected from the group consisting of erythritol, xylitol, sorbitol, and mixtures thereof.

9. A method in accordance with claim 8 wherein the polyol fatty acid polyester is a sugar fatty acid polyester containing a sugar selected from the group consisting of sucrose, glucose, xylose, ribose, mannose, arabinose, galactose, fructose, sorbose, maltose, lactose, and mixtures thereof.

10. A method in accordance with claim 9 wherein the polyol fatty acid polyester is sucrose fatty acid polyester.

11. A method in accordance with claim 10 wherein the sucrose fatty acid polyester contains at least about 85% of sucrose fatty acid octaesters, sucrose fatty acid heptaesters, sucrose fatty acid hexaesters, or mixtures thereof.

12. A method in accordance with claim 10 wherein the sucrose fatty acid polyester contains no more than about 35% of the sucrose fatty acid hexaesters or sucrose fatty acid heptaesters, and at least about 60% of sucrose fatty acid octaesters.

13. A method in accordance with claim 10 wherein at least about 80% of the fatty acids of the sucrose fatty acid polyester are selected from the group consisting of $C_{16:0}$, $C_{18:0}$, $C_{18:1}$, $C_{18:2}$, $C_{22:0}$, $C_{22:1}$, their geometric and positional isomers, and mixtures thereof.

14. A method in accordance with claim 1 wherein the polyol fatty acid polyester has a melting point in the range of from about 80° F. to about 160° F.

15. A method in accordance with claim 14 wherein polyol fatty acid polyester is heated to a temperature above its melting point prior to mixing with the peanut flour in step (a).

16. A method in accordance with claim 14 wherein mixture of peanut flour and polyol fatty acid polyester is heated with agitation to a temperature above the melting point of the polyol fatty acid polyester.

17. A method in accordance with claim 1 wherein sugar is present in the mixture of step (a) at a level of from about 2% to about 12% by weight based on the weight of the peanut flour.

18. A method in accordance with claim 1 wherein salt is present in the mixture of step (a) at a level of from about 1% to about 4% by weight based on the weight of the peanut flour.

* * * * *